C. P. SPECK.
ELECTRICALLY OPERATED HEATING APPARATUS.
APPLICATION FILED DEC. 7, 1921.
1,437,119.
Patented Nov. 28, 1922.
2 SHEETS—SHEET 1.
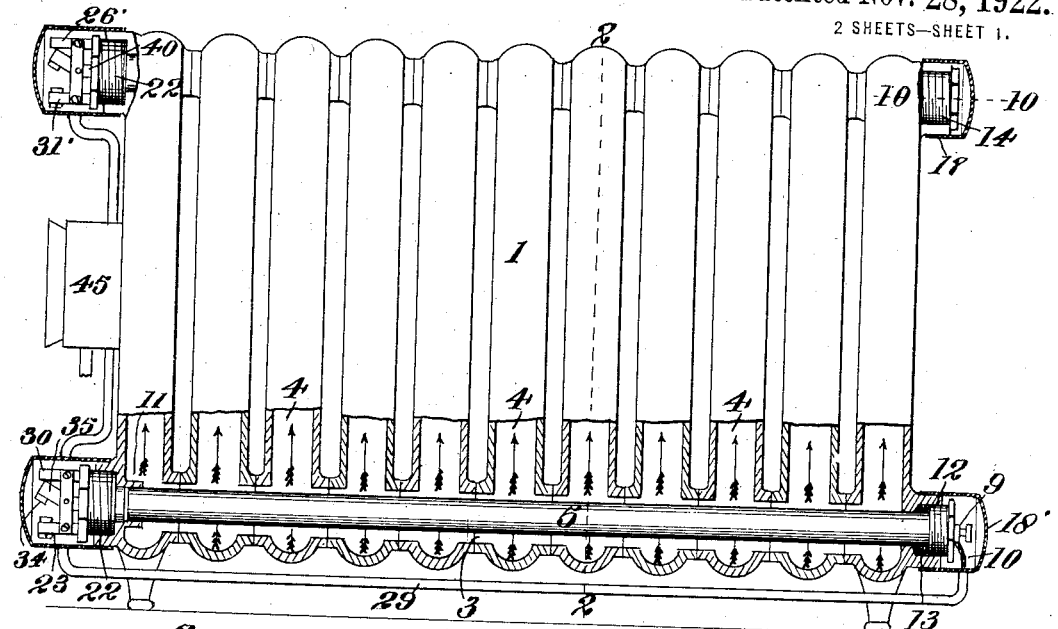
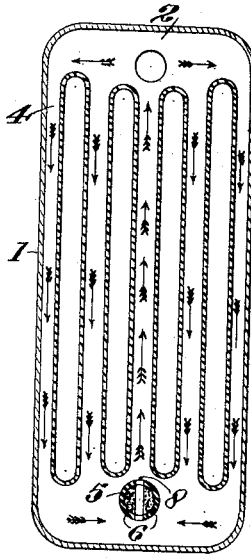
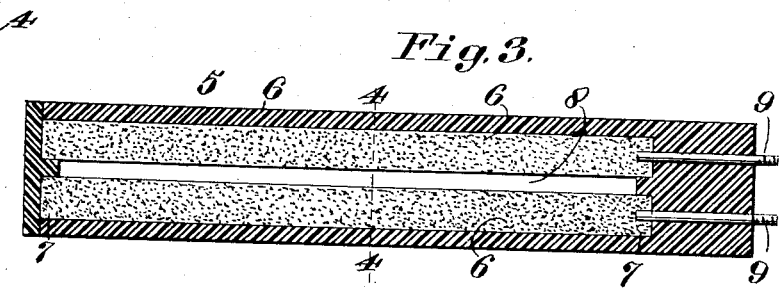
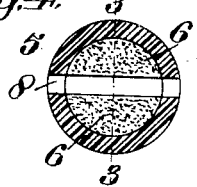
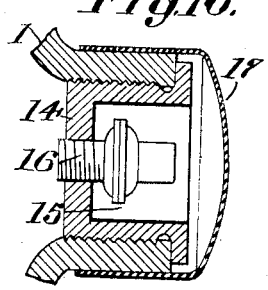
Inventor,
C. P. Speck,
By Cicero V Totten
Attorneys C. P. SPECK.
ELECTRICALLY OPERATED HEATING APPARATUS.
APPLICATION FILED DEC. 7, 1921.

1,437,119.

Patented Nov. 28, 1922.
2 SHEETS—SHEET 2.

Inventor,
C. P. Speck
Attorneys

Patented Nov. 28, 1922.

1,437,119

UNITED STATES PATENT OFFICE.

CLIFFORD P. SPECK, OF EVANSVILLE, INDIANA.

ELECTRICALLY-OPERATED HEATING APPARATUS.

Application filed December 7, 1921. Serial No. 520,509.

*To all whom it may concern:*

Be it known that I, CLIFFORD P. SPECK, a citizen of the United States, residing at Evansville, in the county of Vanderburg and State of Indiana, have invented certain new and useful Improvements in Electrically-Operated Heating Apparatus, of which the following is a specification.

The present invention relates to an electrically operated closed unit heating system, preferably of the radiator type, wherein the heating medium is contained therein under vacuum.

The principal objects of the present invention are to provide a heater of the conventional circulating radiator type, wherein the application of electric power to the heating elements is controlled by a plurality of automatic devices, certain operated by temperature and others operated by pressure within the radiator, enabling the controlling of the apparatus within certain degrees of temperatures and certain degrees of pressure. Another object is to provide a novel form of heating unit wherein the fluid within the radiator forms the conductor for the electricity; a further object is to provide a heating element so positioned and formed as to maintain a circulation of the heating fluid within the radiator. Other points of advantage in construction and operation will appear as the description of the invention proceeds.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

In the drawings disclosing the preferred embodiment of my invention:—

Fig 1 is a view in broken side elevation of the preferred embodiment of my invention, illustrating the heating element and the safety devices Fig. 2 is a vertical sectional view taken on line 2—2 of Fig. 1, viewed in the direction of the arrows, Fig. 3 is a longitudinal sectional view of the heating element illustrating the fluid circulating passage.

Fig 4 is a transverse sectional view taken on line 4—4 of Fig. 3.

Fig. 10 is a view in detail of the safety valve.

Figure 5:
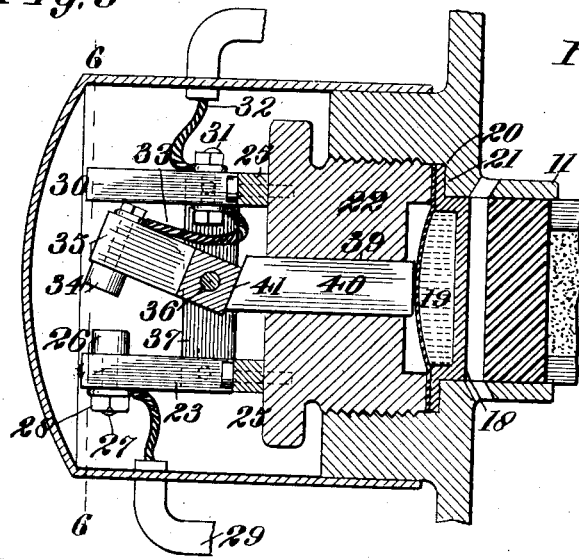
Fig. 5 is a view in vertical section of one of the automatic controlling devices, illustrating the expansible unit associated therewith.
Figure 6:
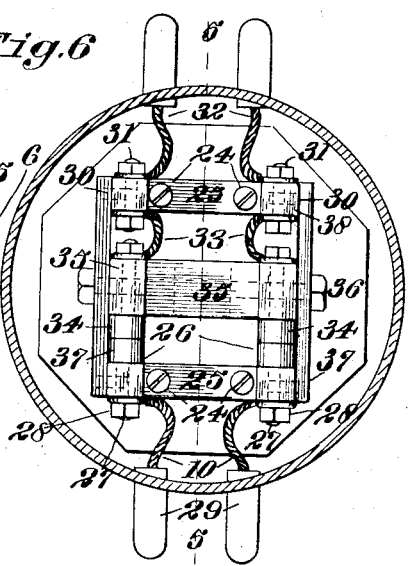
Fig. 6 is a view in front elevation of the controlling device illustrated in Fig. 5, with the movable contact thereof in closed position.

In the drawings, wherein like characters of reference designate corresponding parts—1 indicate the assembled sections of a conventional form of hot water or steam heated radiator, the same being provided with a bore or channel 2 at their upper end and a similar channel 3 at their lower end, said channels 2 and 3 of adjacent sections being disposed in alignment, as in Fig. 1, providing a circulation passage for the fluid from one section to another. The radiator sections are also each provided with vertical passages 4, through which the water circulates vertically within the sections.

In the aligned passage forming openings 3 at the lower ends of the sections 1 is inserted a cylindrical elongated heating unit 5 of insulating material, the same mounting parallel spaced carbon electrodes 6 supported at their opposite ends in pockets or recesses 7 within the member 5, the space 8 between said electrodes being vertically disposed on the insertion of the element within the passage preferably in line with the central vertical passage 4 of each respective radiator section 1. With each of said electrodes 6 connects a terminal 9 and with each terminal is connected a wire 10. The member 5 is inserted longitudinally within the assembled sections 1 from one end of the radiator, its inner end resting in a collar 11 at the opposite end of the passage and its outer end being surrounded by a securing coupling 12 having threaded connection with the end member 1 of the radiator, said coupling preventing leakage around the protruding end of the member 5, due to its compression of a packing gland or gasket 13. One end of the upper aligned opening 2 of the radiator, preferably that end above the coupling 12, is closed by a threaded plug 14 fitting therein, said plug being recessed as at 15 and mounting a pressure actuated blow off safety vent 16 of any well known or conventional type. These corresponding closed ends of the openings 2 and 3 are encased or protected by the respective covers or sheathes 17 and 18'. The opposite end of the lower series of aligned openings 3, at a point adjacent the part 11, is closed by a disk 18, preferably hollow, and formed with an expansible face 18², the interior thereof containing a body of ether 19.

The disk is flanged as at 20, and said flange is held against the seat 21 by a screw threaded plug 22, the outer face of which mounts the outwardly extended terminal supports 23 of non-conducting material held to said face by attaching screws 24 passing through a uniting bar 25 mounting the inner ends of the members 23. The members 23 at their outer ends each carry a terminal post 26 the supporting stud 27 of each passing through their associated members 23 and mounting nuts 28 for retaining the ends of the respective wires 10 to one of said posts 26. The wires in their passage beneath the radiator are enclosed in suitable protecting tubes 29.

Above the members 23 extend outwardly from the face of the closure plug 22 the parallel spaced terminal supports 30, each carrying a terminal 31 to each of which is connected a lead or wire 32. From the terminals 31 extend the conductors 33 each connecting with one end of a movable contact 34, said contacts being each carried at the outer end of a movable arm 35 extending outwardly from a base 35' as at 36, on a shaft extending transversely across said closure plug, the shaft being mounted at its opposite ends in supporting members 37 secured at their upper and lower ends to the respective members 23 and 30.

Mounted to reciprocate within a bore 39 in the plug 22 is a plunger 40, having a beveled outer end 41, and the inner end of said plunger contacts with the expansible face 18' of the member 18. The plunger is of a length to be maintained in contact with the face 18' by the weight of the respective members 35 on the outer beveled end 41 thereof.

Figure 8:
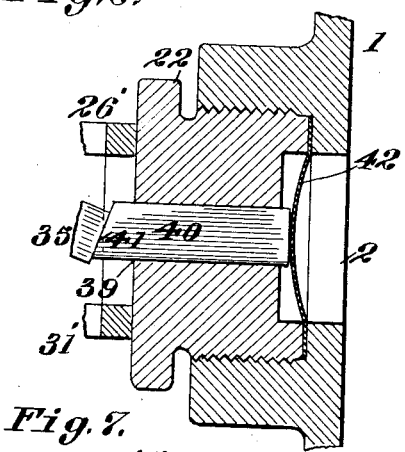
Fig. 8 is a view in detail of one of the pressure actuating devices for the controlling members.
Figure 9:
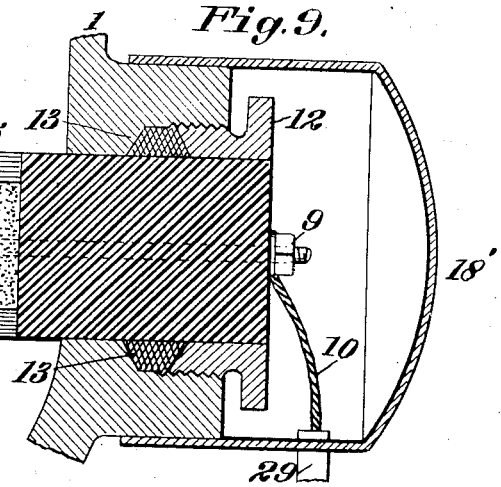
Fig. 9 is a view in detail of the terminal end of the heating element.
Figure 7:
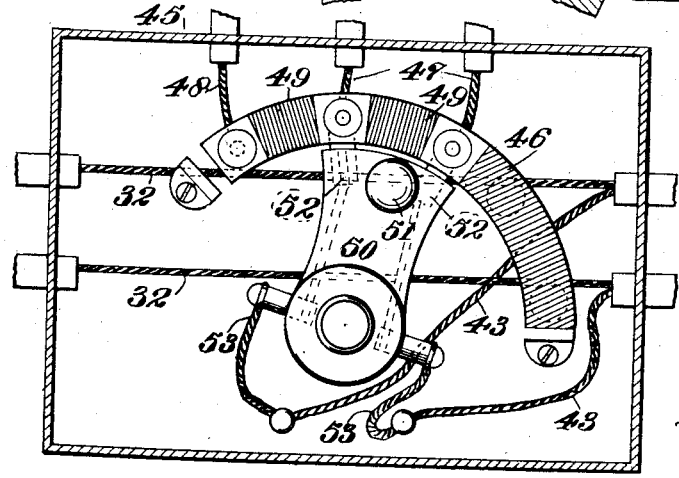
Fig. 7 is a view in plan of the switch or circuit controlling box.

In the end of the aligned openings 2, immediately above the thermal switch just described, is a duplicate construction of said thermal switch except that the thermal member 18 is omitted and a pressure operated diaphragm 42 is inserted in its place Fig. 8. With the binding posts 31' of said pressure controlled switch connect wires 43, Fig. 7, and with the members 26' of said pressure switch connect wires 32. By the use of the pressure switch and the thermal switch, the former being positioned near the top of the radiator and the latter near the bottom and both exposed to the motion thereof, it will be apparent that I provide a means at the top of the radiator controlled solely by the pressure therein for making and breaking the electric circuit, and means at the bottom in series with the other circuit breaker but controlled by the temperature of the fluid within the radiator for making and breaking the electric circuit, and should, for any reason, one fail to operate, it will be readily understood that the other in series with the first will serve as a safety to prevent the overheating of the radiator and insuring the maintaining of an even temperature of the radiator.

At any suitable point, preferably at one end of the radiator, between the circuit breakers, I mount a switch box 45 carrying a stationary segment 46 into which feed the power circuit wires 47 leading from a 220 volt source, and the wire 48 leading from a 110 volt source, these three points being insulated from each other by the material 49.

Co-operating with the segment 46 is an arcuately movable manually operated switch element 50 having an operating handle 51 and of a width to overlap any two of said points 47 or to engage one of said points 47 and said point 48. The element 50 carries the spaced contacts 52, each connecting through a flexible lead 53 with one of said conductors 43, whereby when said contacts 52 register with the points 47 the 220 volt circuit will be passed to the electrodes 6 through wires 10, contacts 26 and 34; wires 33 and 32; wires 44 and the pressure actuated switch, through its leads 43. This 220 volt circuit is made preferably when the radiator is started and when it is desired to quickly raise the temperature thereof by the heating of the fluid therein, but after the fluid has become heated, and it is desired to economically operate the heater and maintain the temperature thereof relatively even, the switch 50 is moved to connect one of the leads 52 with one of said leads 47 and the other lead 52 with the lead 48, providing a 110 volt circuit for the electrodes 6.

Under these conditions both the thermal switch and the pressure switch are in closed position, due to the lack of temperature or pressure within the radiator thus completing the circuit, and should the temperature within the radiator rise above the point of operation of the member 18 and said member fail to operate, the accumulation of pressure at the top of the radiator will cause said pressure member 42 to operate, and thus the circuit to the electrodes 6 would be broken until such time as the pressure is again reduced by the cooling of the fluid.

It is to be understood that on the initial operation of this device, the radiator is vented, the fluid contained within the radiator is heated preferably to a boiling point to drive the air therefrom and the radiator is then sealed, providing a vacuum within the radiator when the fluid cools enabling the energizing of the electrodes to quickly heat the fluid on subsequent operations.

Having thus described my invention, what I claim as new and desire to secure by Letters Patent of the United States is:—

1. In combination with a closed chamber containing a body of heating liquid confined therein in vacuum, a pair of parallel spaced heating electrodes extending into said chamber and submerged in the liquid therein, said electrodes extending longitudinally of the lower part of the chamber space from its side walls affording a fluid circulating passage surrounding the same, a power circuit with which said electrodes are connected, and means within said circuit and operated by the pressure within the chamber for making and breaking said circuit in accordance with the pressure within the chamber.

2. In combination with a closed chamber containing a body of heating liquid confined therein in vacuum, a pair of parallel spaced heating electrodes extending into said chamber and submerged in the liquid therein, said electrodes extending longitudinally of the lower part of the chamber space from its side walls affording a fluid circulating passage surrounding the same, a power circuit with which said electrodes are connected, and means within said circuit and operated by the temperature within said chamber for making and breaking said circuit in accordance with the variation in temperature of the liquid within the chamber.

3. In combination with a closed chamber containing a body of heating liquid confined therein in vacuum, a pair of parallel spaced heating electrodes extending into said chamber and submerged in the liquid therein, said electrodes extending longitudinally of the lower part of the chamber space from its side walls affording a fluid circulating passage surrounding the same, a power circuit with which said electrodes are connected, pressure actuated means and independent temperature actuated means in series in said circuit and positioned at different points in communication with the interior of said chamber for making and breaking said circuit dependent on a variation of temperature and pressure within the chamber.

4. In combination with a sectional radiator consisting of assembled sections communicating with each other through horizontal aligned openings at their top and bottom, and containing a body of heating fluid, a pair of electrodes removably mounted within said radiator and extending longitudinally thereof through said aligned bottom openings, said electrodes lying in spaced relation and submerged in said fluid, and an electric circuit connected with said electrodes.

5. In combination with a sectional radiator consisting of assembled sections communicating with each other through horizontal aligned openings at their top and bottom, and containing a body of heating fluid in vacuum, a heating unit removably mounted within said radiator and extending longitudinally thereof through said bottom aligned openings and including a pair of parallel spaced electrodes, means for removably maintaining said heating unit with its associated electrodes within the radiator, and an electric circuit connected with said electrodes.

6. In combination with a sectional radiator consisting of assembled sections communicating with each other through horizontal aligned openings at their top and bottom, a heating unit mounted within said bottom aligned openings within said radiator and extending longitudinally of the radiator for its full interior length, said unit adapted for removal from said radiator through one end of said bottom aligned openings, said unit comprising a shell of insulating material and a pair of parallel spaced electrodes mounted therein for normal exposure to and submergence in the heating fluid, means for closing the end of said radiator opening through which said unit is inserted, an electric circuit connected with said electrodes, an automatically operated circuit breaker within said circuit, and a member closing the opposite end of said bottom aligned openings and mounting said circuit breaker.

7. In combination with a fluid containing sectional radiator provided at its top and bottom with aligned fluid circulating openings forming fluid circulating passages at the top and bottom of the radiator each open at the opposite ends of the radiator, a pair of heating electrodes insertable as a unit into the bottom passage through one open end, means for retaining the same within the radiator opening and for closing said open end of said passage, an electric circuit, a thermal member exposed to the fluid within the radiator and adapted for closing the outer end of said passage, a plug for retaining said member in position, a circuit breaker carried by said plug and operated by said thermal member, a pressure operated diaphragm exposed to the pressure within the radiator and adapted for closing one end of the top passage, a plug for retaining the same in position, a circuit breaker carried by said plug and in series with said first circuit breaker and operated by a difference in pressure within said radiator, a plug for closing the opposite end of said top passage, a pressure actuated safety valve carried thereby, and a controlling switch in said circuit in advance of said circuit breakers.

8. In combination with a sectional radiator provided at its top and bottom with aligned fluid circulating openings forming between said sections a fluid circulating passage at the top and bottom of the radiator, said radiator adapted for containing a body of fluid under vacuum, and a heating element insertable into said radiator through one end of said bottom passage, said element consisting of spaced electrodes submerged within the fluid and extending through the opening in each section for the full length of the radiator, means for retaining said element in position and for closing its mounting opening in said radiator, and an electric circuit connected with the electrodes.

9. In combination with a sectional radiator provided at its top and bottom with aligned fluid circulating openings forming between said sections a fluid circulating passage at the top and bottom of the radiator, said radiator adapted for containing a body of fluid under vacuum, and a heating element insertable into said radiator through one end of said bottom passage, said element consisting of spaced electrodes submerged within the fluid and extending through the opening in each section for the full length of the radiator, means for retaining said element in position and for closing its mounting opening in said radiator, a diaphragm over the other end of said opening, a part for holding said diaphragm in position, a circuit breaker associated with said part and operated by said diaphragm, and an electric circuit connected with said electrodes through said circuit breaker.

10. In combination with a sectional radiator provided at its top and bottom with aligned fluid circulating openings forming between said sections a fluid circulating passage at the top and bottom of the radiator, said radiator adapted for containing a body of fluid under vacuum, and a heating element insertable into said radiator through one end of said bottom passage, said element consisting of spaced electrodes submerged within the fluid and extending through the opening in each section for the full length of the radiator, means for retaining said element in position and for closing its mounting opening in said radiator, a diaphragm over the other end of said opening, a part for holding said diaphragm in position, a circuit breaker associated with said part, a plunger associated with the circuit breaker and actuated by the movement of said diaphragm, and an electric circuit connected with said electrodes through said circuit breaker.

In testimony whereof I have signed my name to this specification.

CLIFFORD P. SPECK.